Jan. 27, 1970       J. S. RHYNE       3,492,381
FASTENING METHOD
Filed Dec. 19, 1966
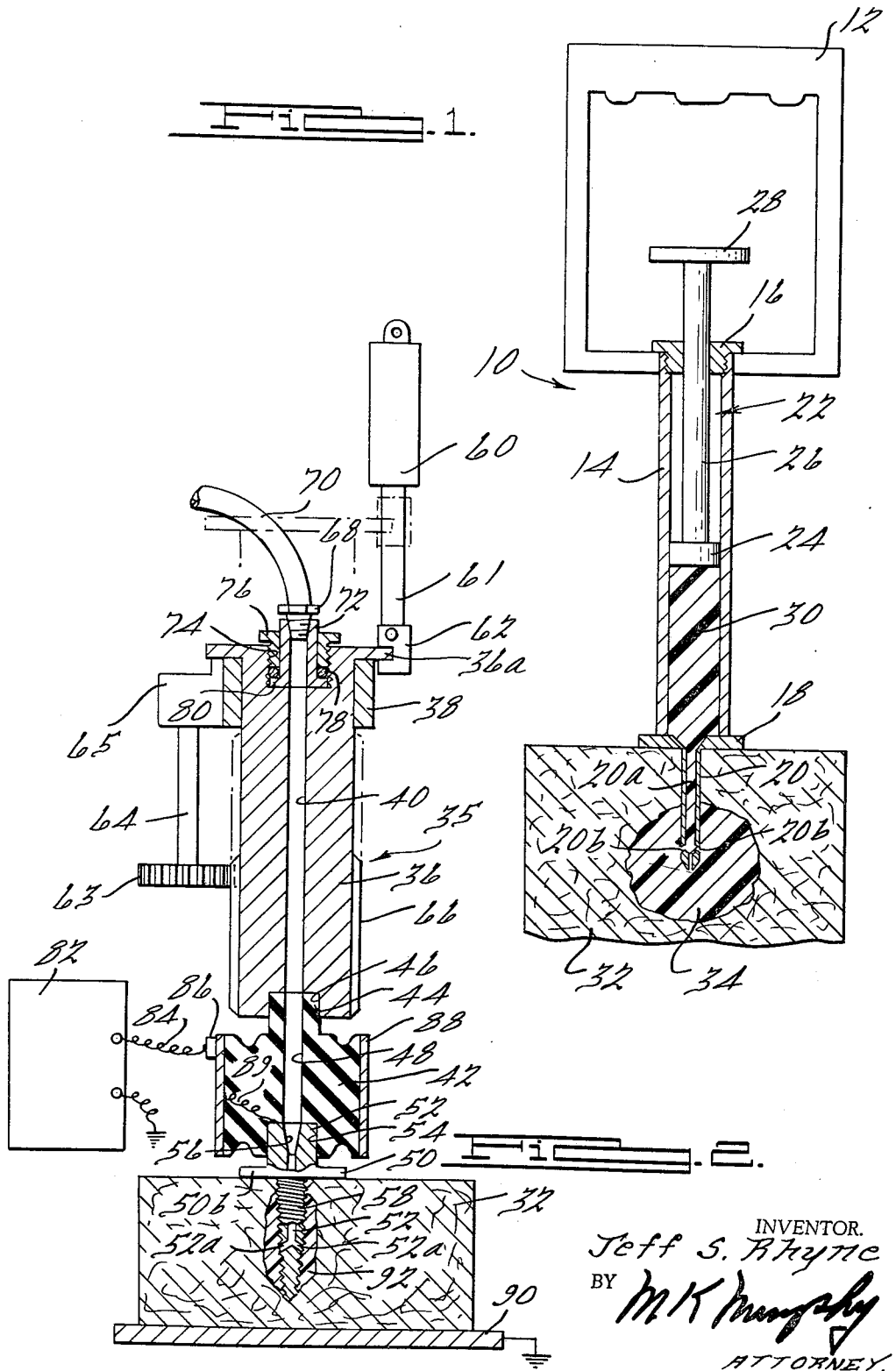
INVENTOR.
Jeff S. Rhyne
BY M K Murphy
ATTORNEY.

United States Patent Office 3,492,381
Patented Jan. 27, 1970

3,492,381
FASTENING METHOD
Jeff S. Rhyne, 537 E. Lafayette St.,
Marianna, Fla. 32446
Filed Dec. 19, 1966, Ser. No. 602,663
Int. Cl. B29j 5/00; B29f 1/10
U.S. Cl. 264—27                2 Claims

ABSTRACT OF THE DISCLOSURE

A method of attaching various objects to a board member formed of a loose, porous material incapable of retaining screws, bolts or the like, wherein an adhesive in liquid form is injected into the board member to locally displace the internal matrix of the board and form an island or mass of adhesive within the board which mass, after setting, will receive and retain screws, bolts, etc. and thereby allow the same to be used to attach various objects to the board, Also, two forms of apparatus for carrying out the method of the invention.

BACKGROUND OF THE INVENTION

This invention relates to a method and apparatus for fastening a member formed of an extremely porous or soft material to another member by the use of screws, bolts or the like.

Inexpensive composition materials are finding ever increasing application in many industries. One example of such a composition material is chip core of flakeboard, a board consisting of wood shavings held together in various degrees of looseness by an adhesive. Another example of such a composition material consists of a very thin film of fiber glass surrounding a core of polyurethane foam or similar flotation material. Another example is the interior wall panels used in the building trades comprising a core of fiber glass, rock wool or other insulating material encased in a thin plastic or decorative surface material. These inexpensive composition materials are extremely difficult to fasten to other members by the use of screws or bolts since the loose matrix of the material allows the screws to readily work loose and eventually pull completely out.

Specifically, whereas flakewood is otherwise well suited for use in the manufacture of inexpensive furniture, the fact that it is difficult to attach by the use of screws or bolts detracts considerably from its commercial utility. Similarly, whereas fiber glass encased polyurethane foam is otherwise ideally suited for use in the fabrication of small pleasure boats, surf boards, floats, etc., the material will not retain screws or bolts so that other, more expensive, methods must be resorted to attach such items as fixtures, hardware, or handles to the polyurethane body of the boat, board, etc. The fiber glass or rock wool interior wall panels present similar attachment problems rooted in the inherent inability of the material to retain a threaded fastener member.

SUMMARY OF THE INVENTION

It is the general object of the present invention to provide an improved fastening method.

A more specific object is to provide an improved method for fastening a member formed of a porous material to another member.

Yet a more specific object is to provide a method of securely fastening a porous member to another member by the use of screws, bolts, or the like.

The method of the invention is used to prepare a member formed of a soft or porous material for attachment to another member by the use of screws, bolts, or the like. According to the invention method, a settable adhesive or like material in a plastic or fluid state is injected into the interior of the porous member under a pressure sufficient to locally displace the matrix and form an island or mass of the adhesive material within the member, whereafter the adhesive mass is set to form a relatively firm mass within the porous member for threaded receipt of a screw, bolt, or the like. The screw or bolt will not readily pull out of the hardened adhesive mass because of the firmness of the latter, and the adhesive mass in turn will not readily pull out of the porous board material because of the relatively large area over which the screw or bolt loads are distributed within the board by the adhesive mass.

BRIEF DESCRIPTION OF THE DRAWINGS

The accompanying drawing illustrates preferred embodiments of the invention. In the drawing:

FIG. 1 is a partially schematic view of a first form of an injector apparatus for carrying out the process of the invention; and FIG. 2 is a partially schematic view of a second form of an injector apparatus for carrying out the process of the invention.

DESCRIPTION OF THE PREFERRED EMBODIMENTS

The injector apparatus seen generally at 10 in FIG. 1 includes an injector handle 12, a tube 14 secured to and extending downwardly from handle 12, a plug 16 sealing the upper end of tube 14, a flange 18 secured to the lower end of tube 14, a hollow needle 20 secured to and projecting downwardly from flange 18 and communicating at its upper end with the interior of tube 14, and a plunger 22. Plunger 22 includes a piston portion 24 slidably received within tube 14, a rod portion 26 extending upwardly from piston portion 24 and passing slidably through a suitable aperture in plug 16, and a handle portion 28 formed as a radial enlargement of the upper end of rod portion 26.

In using the injector of FIG. 1 to practice the method of the invention, tube 14 is first filled with an adhesive material 30 in liquid or plastic form. The adhesive material 30 may take many forms including, but not limited to, various binders, glues, resins and adhesives. One particularly effective material is a urea adhesive with an acid catalyst added. The urea adhesive is liquid at room temperatures but will harden within several hours after the addition of the acid catalyst.

With tube 14 filled with suitable liquid adhesive, needle 20 is inserted into the porous member (e.g. a piece of flakeboard or chip core 32) to an extent to press flange 18 against the upper surface of the member. Plunger 22 is then depressed to force liquid adhesive 30 downwardly through the hollow central passage 20a of needle 20. Adhesive exits from needle 20 and enters the surrounding matrix of member 32 through lateral ports 20b as well as through the lower end of passage 20a; the adhesive is forced out of the needle with a pressure sufficient to rupture the cells of the material and allow the matrix of the material to be locally displaced to an extent to allow the formation of an adhesive mass or globule 34 around the lower end of the needle. Flange 18 coacts with the upper face of board 32 to form a seal to preclude leakage of adhesive out of the upper face of the board. The size of the adhesive mass will of course depend upon the length of the stroke imparted to plunger 22.

The injector is now withdrawn from member 32, leaving a small pilot hole where the needle entered the material. If the board is now left at room temperature, the acid catalyst will act on the urea adhesive and cause it to set or harden within approximately two hours; if faster setting is desired, heat may be applied.

After the adhesive mass has set, any of various objects may be attached to board 32 by the use of a screw threaded into the locating hole left by the needle for threaded engagement with mass 34. The screw may be threaded into mass 34 directly; alternatively, a drill may be used to bore through the pilot hole into the adhesive mass, whereafter the bore may be tapped to provide a suitable thread for receipt of the screw.

The alternate form of injector seen in FIG. 2 and generally identified therein by the reference numeral 35 includes a generally cylindrical main body member 36 slidably journaled in a rigid sleeve 38 and having a central bore 40; a cylindrical member 42 of electrically insulating material having an upper pilot portion 44 received with a force fit in a pilot hole 46 in the lower end of main body member 36 and having a central bore 48 in vertical alignment with bore 40; a flange member 50 of electrically conductive material having an upper pilot portion 52 received with a force fit in a pilot hole 54 in the lower end of insulator member 42 and having a central bore 56 in vertical alignment with bores 40 and 48; and a needle 58 extending rigidly downwardly from flange member 50 and having a central bore 52 in vertical alignment with bores 40, 48 and 56. The exterior surface of needle 58 is shaped as a screw thread.

A collar 62 carried on the lower end of the piston rod 61 of a double acting hydraulic cylinder 60 slidably embraces a flange 36a constituted by a radial enlargement of the upper end of main body member 36, and a pinion gear 63 driven by the shaft 64 of a reversible electric motor 65 carried by rigid sleeve 38 meshes with a gear 66 provided on the lower end of main body member 36.

The fitting 68 of a hydraulic hose 70 is threaded into the upper end of a swivel seal 72 received in a counterbore 74 in the upper end of main body member 36; seal 72 is journaled in a plug 76 threaded into counterbore 74. An O ring 78 is interposed between the lower end of plug 76 and the upper face of a flange portion 80 on the lower end of seal 72.

A radio frequency oscillator 82 of any known form is connected by wire 84 to a brush 86 slidably engaging a slip ring 88 surrounding insulator member 42. Ring 88 is electrically connected to flange member 50 by a wire 89 passing through insulator member 42.

In using the injector of FIG. 2 to practice the method of the invention, the piece of flakeboard 32 is placed on a grounded metal plate 90 and the injector 35 is positioned over board 32 in a raised position (seen in phantom in FIG. 2) in which piston rod 61 is retracted to space flange portion 36a above the upper end of sleeve 38 and position pinion gear 64 opposite the lower portion of the gear face of gear 66.

In operation, hydraulic cylinder 60 is actuated in a sense to extend piston rod 61 and push needle 58 downwardly into board 32 while motor 68 is simultaneously energized to rotate needle 58 through gears 63 and 66. Needle 58 thus threads into board 32 until the flange portion 50b of flange member 50 moves into abutting relation with the upper face of board 32.

An adhesive in fluid form, which may again comprise a urea adhesive with an acid catalyst added, is now supplied under pressure through hose 70; the liquid adhesive passes downwardly through aligned bores 40, 48 and 56 and into central bore 52 of needle 58. Adhesive exits from needle 58 and enters the surrounding matrix of member 32 through lateral ports 52a; the adhesive is forced out of needle 58 with a pressure sufficient to rupture the cells of the material and allow the matrix of the material to be locally displaced to an extent to allow the formation of an adhesive mass or globule 92 around needle 58. Flange portion 50b coacts with the upper face of board 32 to form a seal to preclude leakage of adhesive out of the upper face of the board. The size of the adhesive mass will of course depend on the length of time that the injection of the liquid adhesive is continued.

The injector needle is not immediately withdrawn from the board, as in the case of the injector of FIG. 1, but rather is left in place within the board while the radio frequency oscillator is energized to pass electrical energy through brush 86, slip ring 88, and wire 89 to needle 58. This establishes a high voltage, high frequency dielectric field between needle 58 and grounded plate 90. The stress set up in adhesive mass 92 by this dielectric field quickly heats up the adhesive and causes it to set; since the catalyst added to the liquid adhesive is specifically chosen for its effectiveness in dielectric heating, the setting process may be performed within a matter of a few seconds.

As soon as the adhesive mass has set, oscillator 82 is deenergized and double acting cylinder 60 is actuated in a sense to retract piston rod 61 while reversible motor 65 is energized in a sense to rotate needle 58 in the direction opposite to that in which it was turned during insertion of the needle. Needle 58 is thus backed out of board 32, leaving a pre-threaded and cured mass of adhesive within the board. A screw of a size conforming to the size of the thread formed on the exterior of needle 58 may now be readily threaded into mass 92 to facilitate the attachment of various objects to board 32.

The invention will be seen to provide a simple, inexpensive method to enable screws or other threaded fasteners to be used with materials that are otherwise unable to retain a screw. The invention method thus enhances the commercial acceptability of the various inexpensive composition board materials in existing applications, and in addition opens up new applications for these materials to which they were formerly unsuited because of the porous, flakey nature of their matrix.

While preferred embodiments of the invention have been illustrated and described in detail, it will be understood that various changes and modifications may be made in the disclosed embodiments without departing from the scope or spirit of the invention as defined in the appended claims. For example, although the invention method has been described with reference to an adhesive material, and with particular reference to a urea adhesive with an acid catalyst, it will be apparent that many other and distinctly different materials may be used, the only requirements being that the material be readily convertible, either chemically or cooling, from a fluid state to a solid state and capable of retaining its solid state at room temperatures. Thus, the invention method may utilize any number of materials that become liquid at elevated temperatures and harden at normal temperatures, such as sealing wax, asphalt or rosin. The invention method may also utilize any number of materials that set or cure by chemical action, such as epoxy glues.

I claim:

1. A method of preparing a member of relatively soft material for attachment to another member by the use of screws, bolts or the like comprising the steps of threading a hollow screw member into the matrix of said soft member, forcing settable material through the hollow interior of said screw and outwardly into the matrix of said soft member, setting said settable material to form a relatively hard mass, and then threading said screw backwardly out of said mass to leave a prethreaded hardened mass for receipt of a threaded fastener element.

2. The method of claim 1 wherein said setting step comprises establishing a dielectric field across said mass.

References Cited

UNITED STATES PATENTS

| 2,663,662 | 12/1953 | Graf et al. | 264—263 |
| 2,313,110 | 3/1943 | Wertz | 264—69 |
| 3,182,102 | 5/1965 | Simnad | 264—27 |
| 2,131,319 | 9/1938 | Greenholtz et al. | 264—318 |

FOREIGN PATENTS 365,124  7/1930  Great Britain.

ROBERT F. WHITE, Primary Examiner

R. SHEAR, Assistant Examiner

U.S. Cl. X.R.

18—30; 264—36, 259, 267, 319